United States Patent
Sair et al.

(10) Patent No.: US 10,083,032 B2
(45) Date of Patent: Sep. 25, 2018

(54) SYSTEM, APPARATUS AND METHOD FOR GENERATING A LOOP ALIGNMENT COUNT OR A LOOP ALIGNMENT MASK

(75) Inventors: Suleyman Sair, Chandler, AZ (US); Elmoustapha Ould-Ahmed-Vall, Chandler, AZ (US)

(73) Assignee: Intel Corporation, Santa Clara, CA (US)

( * ) Notice: Subject to any disclaimer, the term of this patent is extended or adjusted under 35 U.S.C. 154(b) by 705 days.

(21) Appl. No.: 13/993,321

(22) PCT Filed: Dec. 14, 2011

(86) PCT No.: PCT/US2011/064953
§ 371 (c)(1),
(2), (4) Date: Jun. 11, 2013

(87) PCT Pub. No.: WO2013/089709
PCT Pub. Date: Jun. 20, 2013

(65) Prior Publication Data
US 2014/0201510 A1    Jul. 17, 2014

(51) Int. Cl.
*G06F 9/30* (2018.01)
*G06F 9/38* (2018.01)
(Continued)

(52) U.S. Cl.
CPC ...... *G06F 9/30065* (2013.01); *G06F 9/30018* (2013.01); *G06F 9/30036* (2013.01);
(Continued)

(58) Field of Classification Search
CPC ............................................. G06F 9/00–9/3897
See application file for complete search history.

(56) References Cited

U.S. PATENT DOCUMENTS 4,814,976 A * 3/1989 Hansen ............... G06F 9/30043
711/201
5,794,029 A * 8/1998 Babaian ................. G06F 9/325
712/241
(Continued)

FOREIGN PATENT DOCUMENTS

| CN | 1632742 A | 6/2005 |
|---|---|---|
| CN | 101206635 A | 6/2008 |
| CN | 102109977 A | 6/2011 |

OTHER PUBLICATIONS

Shahbahrami, A., Juurlink, B. and Vassiliadis, S. (2006) Performance impact of misaligned accesses in SIMD extensions. Proc. 17th Annual Workshop on Circuits, Systems and Signal Processing (ProRISC2006), Veldhoven, The Netherlands, Nov. 23-24, pp. 334-342.*

(Continued)

*Primary Examiner* — Keith E Vicary
(74) *Attorney, Agent, or Firm* — Nicholson De Vos Webster & Elliott, LLP

(57) ABSTRACT

A loop alignment instruction indicates a base address of an array as a first operand, an iteration limit of a loop as a second operand, and a destination. The loop contains iterations and each iteration includes a data element of the array. A processor receives the loop alignment instruction, decodes the instruction for execution, and stores a result of the execution in the destination. The result indicates the number of data elements at a beginning of the array that are to be handled separately from a remaining portion of the array, such that the base address of the remaining portion of the array aligns with an alignment width.

17 Claims, 14 Drawing Sheets

```
PLCNT[B/W/D/Q] rax, rbx, rcx, imm        ; destination (DEST), base address (SRC1), loop limit (SRC2), requested alignment (VL)

w ← 1, 2, 4, 8                           ; element width in bytes (based on mnemonic)
VL ← 64, 32, 16, 8                       ; requested alignment width in bytes
alignment_mask ← ~(VL-1)                 ; mask off alignment address bits
IF (SRC1 AND (VL-1))                     ; if address is not aligned
    THEN
            aligned_address ← (SRC1 AND alignment_mask) + VL
            alignment_iterations ← (aligned_address - SRC1)/w
            DEST ← MIN(alignment_iterations, SRC2)
    ELSE
            DEST ← 0             ; address already aligned
FI
```

(51) Int. Cl.
*G06F 9/345* (2018.01)
*G06F 9/32* (2018.01)

(52) U.S. Cl.
CPC .......... *G06F 9/30072* (2013.01); *G06F 9/325* (2013.01); *G06F 9/345* (2013.01); *G06F 9/3824* (2013.01)

(56) References Cited

U.S. PATENT DOCUMENTS

| | | | | |
|---|---|---|---|---|
| 5,933,650 | A * | 8/1999 | van Hook | G06F 5/00 |
| | | | | 712/2 |
| 5,936,872 | A * | 8/1999 | Fischer | G06F 7/4812 |
| | | | | 708/622 |
| 6,892,295 | B2 | 5/2005 | Saulsbury | |
| 7,290,123 | B2 | 10/2007 | Gat | |
| 7,366,882 | B2 | 4/2008 | Sahraoui et al. | |
| 7,395,531 | B2 * | 7/2008 | Eichenberger | G06F 8/4452 |
| | | | | 712/22 |
| 2003/0056064 | A1 * | 3/2003 | Gschwind | G06F 9/30032 |
| | | | | 711/154 |
| 2005/0102495 | A1 | 5/2005 | Huang et al. | |
| 2005/0283773 | A1 | 12/2005 | Eichenberger et al. | |
| 2006/0101256 | A1 | 5/2006 | Dwyer et al. | |
| 2007/0150705 | A1 | 6/2007 | Mishaeli et al. | |
| 2008/0155210 | A1 * | 6/2008 | Taunton | G06F 9/30036 |
| | | | | 711/161 |
| 2009/0172349 | A1 * | 7/2009 | Sprangle | G06F 9/30025 |
| | | | | 712/4 |
| 2009/0235052 | A1 | 9/2009 | Kudo | |
| 2009/0327674 | A1 * | 12/2009 | Codrescu | G06F 8/4452 |
| | | | | 712/241 |
| 2011/0029962 | A1 * | 2/2011 | Nuzman | G06F 8/452 |
| | | | | 717/160 |
| 2014/0095830 | A1 * | 4/2014 | Plotnikov | G06F 9/30018 |
| | | | | 712/204 |
| 2014/0201510 | A1 * | 7/2014 | Sair | G06F 9/30036 |
| | | | | 712/241 |

OTHER PUBLICATIONS

Aart J. C. Bik, Milind Girkar, Paul M. Grey, and Xinmin Tian. Automatic intra-register vectorization for the Intel architecture. Int. J. Parallel Program., 30(2):65-98, 2002.*

Samuel Larsen, Emmett Witchel, and Saman Amarasinghe. Increasing and Detecting Memory Address Congruence. In Proceedings of the International Conference on Parallel Architectures and Compilation Techniques, 2002. 12 pages.*

Hoseok Chang, Wonyong Sung, Efficient vectorization of SIMD programs with non-aligned and irregular data access hardware, Proceedings of the 2008 international conference on Compilers, architectures and synthesis for embedded systems, Oct. 19-24, 2008, Atlanta, GA, USA; pp. 167-175.*

Peng Wu, Alexandre E. Eichenberger, and Amy Wang. Efficient SIMD Code Generation for Runtime Alignment and Length Conversion. In Proceedings of the International Symposium on Code Generation and Optimization, 2005. 12 pages.*

Alexandre E. Eichenberger, Peng Wu, and Kevin O'Brien. Vectorization for SIMD Architectures with Alignment Constraints. In Proceedings of the Conference on Programming Language Design and Implementation, 2004. pp. 82-93.*

PCT International Search Report for PCT Counterpart Application No. PCT/US2011/064953, 3 pgs., (Jul. 23, 2012).

PCT Written Opinion of the International Searching Authority for PCT Counterpart Application No. PCT/US2011/064953, 4 pgs., (Jul. 23, 2012).

PCT Notification concerning Transmittal of International Preliminary Report on Patentability (Chapter I of the Patent Cooperation Treaty) for PCT Counterpart Application No. PCT/US2011/064953, 6 pgs., (Jun. 26, 2014).

PCT International Search Report for PCT Application No. PCT/US2011/064942, 3 pgs., (Aug. 29, 2012).

PCT Written Opinion of the International Searching Authority for PCT Application No. PCT/US2011/064942, 4 pgs., (Aug. 29, 2012).

PCT Notification concerning Transmittal of International Preliminary Report on Patentability (Chapter I of the Patent Cooperation Treaty) for PCT Application No. PCT/US2011/064942, 6 pgs., (Jun. 26, 2014).

Office Action from foreign counterpart China Patent Application No. CN2011874918.5, daetd Sep. 1, 2016, 22 pages.

Second Office Action from foreign counterpart China Patent Application No. 201180074918.5, dated Apr. 28, 2017, 24 pages.

* cited by examiner

600

| DATA ELEMENT WIDTH | ALIGNMENT WIDTH | | | |
|---|---|---|---|---|
| | 64 BITS (8B) | 128 BITS (16B) | 256 BITS (32B) | 512 BITS (64B) |
| 8-BIT BYTES (B) | 8 | 16 | 32 | 64 |
| 16-BIT WORDS (W) | 4 | 8 | 16 | 32 |
| 32-BIT DWORD (D) | 2 | 4 | 8 | 16 |
| 64-BIT QWORD (Q) | 1 | 2 | 4 | 8 |

NUMBER OF BITS IN LOOP ALIGNMENT MASK

```
PLCNT[B/W/D/Q] rax, rbx, rcx, imm          ; destination (DEST), base address (SRC1), loop limit (SRC2), requested alignment (VL)

w ← 1, 2, 4, 8                              ; element width in bytes (based on mnemonic)
VL ← 64, 32, 16, 8                          ; requested alignment width in bytes
alignment_mask ← ~(VL-1)                    ; mask off alignment address bits
IF (SRC1 AND (VL-1))                        ; if address is not aligned
    THEN
        aligned_address ← (SRC1 AND alignment_mask) + VL
        alignment_iterations ← (aligned_address − SRC1)/w
        DEST ← MIN(alignment_iterations, SRC2)
ELSE
        DEST ← 0                            ; address already aligned
FI
```

FIG. 8A

```
PLMSK[B/W/D/Q] k1, rbx, rcx, imm           ; destination (DEST), base address (SRC1), loop limit (SRC2), requested alignment (VL)

w ← 1, 2, 4, 8                              ; element width in bytes (based on mnemonic)
VL ← 64, 32, 16, 8                          ; requested alignment width in bytes
alignment_mask ← ~(VL-1)                    ; mask off alignment address bits
IF (SRC1 AND (VL-1))                        ; if address is not aligned
    THEN
        aligned_address ← (SRC1 AND alignment_mask) + VL
        alignment_iterations ← (aligned_address − SRC1)/w
        DEST ← MIN(alignment_iterations, SRC2)
        DEST ← (1<<n) − 1
    ELSE
        DEST ← 0                            ; address already aligned
FI
```

FIG. 8B

KSUBREM[B/W/D/Q] k1, rbx, rcx                ; destination (DEST), current iteration count (SRC1), loop limit (SRC2)

VL ← 64, 32, 16, 8                           ; number of vector elements (which is based on the data element width indicated by the mnemonic)
remaining_iterations ← MIN((SRC2 – SRC1), VL);   ; mask off alignment address bits
DEST ← (1<<remaining_iterations)-1;

FIG. 8C

SYSTEM, APPARATUS AND METHOD FOR GENERATING A LOOP ALIGNMENT COUNT OR A LOOP ALIGNMENT MASK

CROSS-REFERENCE TO RELATED APPLICATION

This patent application is a U.S. National Phase Application under 35 U.S.C. § 371 of International Application No. PCT/US2011/064953, filed Dec. 14, 2011, entitled SYSTEM, APPARATUS AND METHOD FOR GENERATING A LOOP ALIGNMENT COUNT OR A LOOP ALIGNMENT MASK.

FIELD OF THE INVENTION

Embodiments relate to computer processor architecture. In particular, embodiments relate to instructions which when executed cause a particular result.

DESCRIPTION OF THE RELATED ART

Many processors have Single Instruction, Multiple Data (SIMD) architectures. The SIMD architectures generally help to significantly improve processing speed. In SIMD architectures, instead of a scalar instruction operating on only one data element or pair of data elements, a packed data instruction, vector instruction, or SIMD instruction may operate on multiple data elements or multiple pairs of data elements simultaneously or in parallel. The processor may have parallel execution hardware responsive to the packed data instruction to perform the multiple operations simultaneously or in parallel.

In SIMD architectures multiple data elements may be packed within one register or memory location as packed data or vector data. In packed data, the bits of the register or other storage location may be logically divided into a sequence of multiple fixed-sized data elements. Each of the data elements may represent an individual piece of data that is stored in the register or storage location along with other data elements typically having the same size. For example, a 256-bit wide register may have four 64-bit wide packed data elements, eight 32-bit wide packed data elements, sixteen 16-bit wide packed data elements, or thirty-two 8-bit wide packed data elements. Each of the packed data elements may represent a separate individual piece of data (e.g., a color of a pixel, etc.) that may be operated upon separately or independently of the others.

Representatively, one type of packed data instruction, vector instruction, or SIMD instruction (e.g., a packed add instruction) may specify that a single packed data operation (e.g., addition) be performed on all corresponding pairs of data elements from two source packed data operands in a vertical fashion to generate a destination or result packed data. The source packed data operands may be of the same size, may contain data elements of the same width, and thus may each contain the same number of data elements. The source data elements in the same bit positions in the two source packed data operands may represent pairs of corresponding data elements. The packed data operation may be performed separately or independently on each of these pairs of corresponding source data elements to generate a matching number of result data elements, and thus each pair of corresponding source data elements may have a corresponding result data element. Typically, the result data elements for such an instruction are in the same order and they often have the same size.

In addition to this exemplary type of packed data instruction, there are a variety of other types of packed data instructions. For example, there are those that have only one, or more than two, source packed data operands, those that operate in a horizontal fashion instead of a vertical fashion, those that generate a result packed data operand of a different size, those that have different sized data elements, and/or those that have a different data element order.

BRIEF DESCRIPTION OF THE DRAWINGS

The invention may best be understood by referring to the following description and accompanying drawings that are used to illustrate embodiments of the invention. In the drawings:

FIGS. 8A-8C illustrate example embodiments of loop alignment instructions and operations thereof.

DETAILED DESCRIPTION

In the following description, numerous specific details are set forth. However, it is understood that embodiments of the invention may be practiced without these specific details. In other instances, well-known circuits, structures and techniques have not been shown in detail in order not to obscure the understanding of this description.

Figure 1:
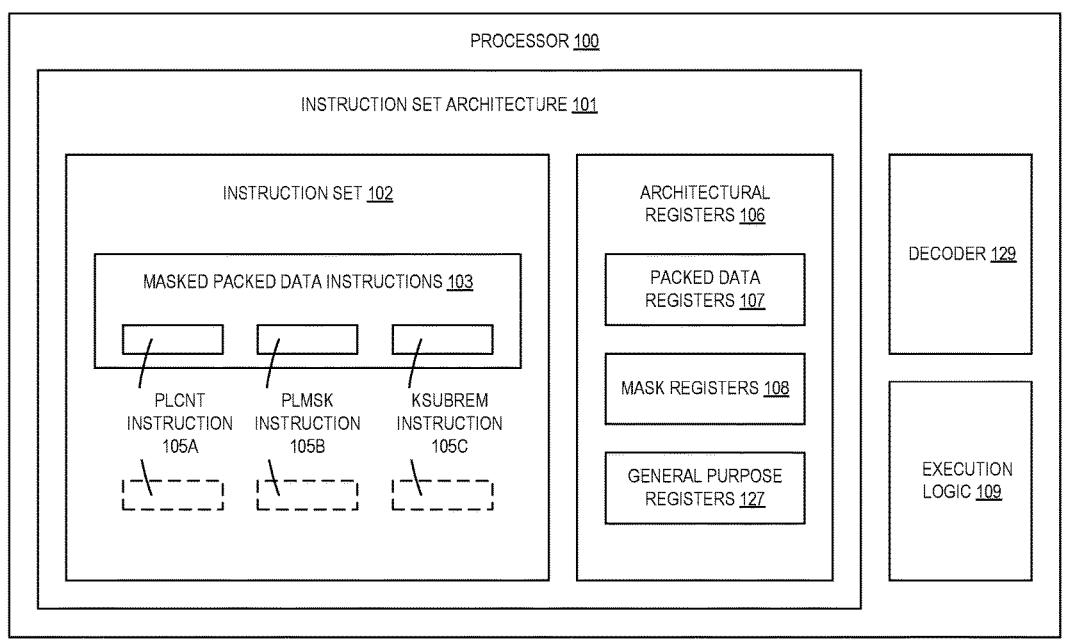
FIG. 1 is a block diagram of an example embodiment of a processor having an instruction set including one or more loop alignment instructions.

FIG. 1 is a block diagram of an example embodiment of a processor 100 having an instruction set 102 including one or more loop alignment instructions. The processor 100 may be any of various complex instruction set computing (CISC) processors, various reduced instruction set computing (RISC) processors, various very long instruction word (VLIW) processors, various hybrids thereof, or other types of processors entirely. In one or more embodiments, the processor 100 may be a general-purpose processor (e.g., a general-purpose microprocessor of the type manufactured by Intel Corporation, of Santa Clara, Calif.), although this is not required. Alternatively, the instruction processing apparatus may be a special-purpose processor. Examples of suitable special-purpose processors include, but are not limited to, network processors, communications processors, cryptographic processors, graphics processors, co-processors, embedded processors, digital signal processors (DSPs), and controllers (e.g., microcontrollers), to name just a few examples.

The processor 100 has an instruction set architecture (ISA) 101. The instruction set architecture 101 represents the part of the architecture of the processor 100 related to programming. The instruction set architecture 101 commonly includes the native instructions, architectural registers, data types, addressing modes, memory architecture, interrupt and exception handling, and external input and output (I/O) of the processor 100. The instruction set architecture 101 is distinguished from the microarchitecture, which generally represents the particular processor design techniques selected to implement the instruction set architecture. Processors with different microarchitectures may share a common instruction set architecture. For example, certain microprocessors by Intel Corporation, of Santa Clara, Calif., and certain microprocessors of Advanced Micro Devices, Inc. of Sunnyvale, Calif., use substantially different internal microarchitectures to implement similar portions of the x86 instruction set.

The instruction set architecture 101 includes architectural registers (e.g., an architectural register file) 106. The illustrated architectural registers 106 include general purpose registers 127 and packed data registers 107. Each of the general purpose registers 127 is operable to store a scalar data element (also referred to as a data element), and each of the packed data registers 107 is operable to store packed data, vector data, or SIMD data (e.g., an array of data elements). The illustrated architectural registers 106 also include mask registers 108. Each of the mask registers 108 is operable to store a packed data operation mask (also referred to as "mask").

The architectural registers 106 represent on-board processor storage locations. The architectural registers 106 may also be referred to herein simply as registers. Unless otherwise specified or clearly apparent, the phrases architectural register, register file, and register are used herein to refer to registers that are visible to the software and/or programmer (e.g., software-visible) and/or the registers that are specified by macroinstructions to identify operands. These registers are contrasted to other non-architectural registers in a given microarchitecture (e.g., temporary registers, reorder buffers, retirement registers, etc.).

The illustrated instruction set architecture 101 also includes an instruction set 102 that is supported by the processor 100. The instruction set 102 includes several different types of instructions. These instructions of the instruction set 102 represent macroinstructions (e.g., instructions provided to the processor 100 for execution), as opposed to microinstructions or micro-ops (e.g., which result from a decoder 129 of the processor 100 decoding macroinstructions).

The instruction set 102 includes one or more loop alignment instructions, such as a loop alignment count (PLCNT) instruction 105A, a loop alignment mask (PLMSK) instruction 105B, and/or a loop remainder mask (KSUBREM) instruction 105C. The PLCNT instruction 105A is a scalar generating instruction, which is operable to cause or result in the processor 100 generating a scalar value, such as an integer value. The scalar value can be stored in the general purpose registers 127. The PLMSK instruction 105B and the KSUBREM instruction 105C are mask generating instructions, each of which is operable to cause or result in the processor 100 generating a mask that can be stored in the mask registers 108.

In one embodiment, one or more of the loop alignment instructions described above are masked packed data instructions 103. The masked packed data instructions 103 may be similar to the packed data instructions mentioned in the background section with a few notable differences. Similar to the aforementioned packed data instructions, each of the masked packed data instructions 103 is operable to cause or result in the processor 100 performing a packed data operation on data elements of one or more packed data operands that are indicated by the packed data instruction. The packed data operands may be stored in the packed data registers 107. However, each of the masked packed data instructions 103 may use one or more mask registers 108 to mask, predicate, or conditionally control the packed data processing. The masks stored in the mask registers 108 may represent mask operands, predicate operands, or conditional operation control operands.

The masks are operable to mask or conditionally control packed data processing at per-data element granularity. For example, the masks may be operable to mask whether or not a result of a packed data operation of the masked packed data instruction 103, performed on individual data elements from a single source packed data operand or individual pairs of corresponding data elements from two source packed data operands, is to be stored in a packed data result. The masked packed data instructions 103 may allow packed data processing of each data element or pair of corresponding data elements to be predicated or conditionally controlled separately and independently of the data elements. The masked packed data instructions 103, operations, and masks may offer certain advantages, such as, for example, increased code density and/or higher instruction throughput.

In alternative embodiments, one or more of the loop alignment instructions described above can be instructions that do not necessarily have the same instruction format as the masked packed data instructions 103; however, these instructions generate results that can be used by the masked packed data instructions 103. The alternative embodiments of the loop alignment instructions are shown as dotted boxes in FIG. 1.

The processor 100 also includes execution logic 109. The execution logic 109 is operable to execute or process the instructions of the instruction set 102. The execution logic 109 may include execution units, functional units, arithmetic logic units, logic units, arithmetic units, etc. The processor 100 also includes the decoder 129 to decode macroinstructions into microinstructions or micro-ops for execution by the execution logic 109.

The PLCNT instruction 105A and the PLMSK instruction 105B compute the number of peel iterations. Peel iterations refers to the initial iterations of a loop that can be taken out of the loop and executed separately from the remaining iterations of the loop. The "initial" iterations of a loop refer to the lowest-indexed portion of the loop if the loop index increments with each iteration, or the highest-indexed portion of the loop if the loop index decrements with each iteration. Taking one or more initial iterations out of a loop is called "loop peeling," which is a technique typically performed for loop optimization. In a common scenario, computations within a loop can involve an array. The base address of the array is not necessarily aligned with the width of a data store (such as the width of the packed data registers 107, a cache line, or other unit of memory) used by the underlying processor for processing packed data. The width of this data store is referred to as the alignment width. A non-aligned base address means that the base address is not an integer multiple of the alignment width. To improve the efficiency of data access, a compiler can generate code to compute the number of peel iterations to shift the non-aligned data elements of an array out of the loop. The number of peel iterations is the same number of these non-aligned data elements that need to be shifted out of the loop, or otherwise need to be handled separately from a remaining portion of the array. The base address (i.e., the starting address) of the remaining portion of the array is aligned with the alignment width; or equivalently, is an integer multiple of the alignment width.

However, the number of peel iterations, as well as the number of remaining iterations in the last vectorized loop operation, generally cannot be resolved at compile time, as the addresses of the array elements are not known at that time. With the instructions described herein, at compile time the compiler can generate PLCNT instruction 105A, the PLMSK instruction 105B and/or the KSUBREM instruction 105C in lieu of other code sequences that perform the same tasks. Thus, a compiler can utilize these loop alignment instructions to simplify its task of loop optimization. In alternative embodiments, the loop alignment instructions can be used by a programmer or other code-generating entity. As the loop alignment instructions are part of the instruction set architecture 101, the processor 100 contains hardware (e.g., the decoder 129) that receives these instructions as inputs and decodes them into microinstructions or micro-ops for execution by the execution logic 109.

The PLCNT instruction 105A and the PLMSK instruction 105B handle the scenario where the beginning of an array is not aligned, while the KSUBREM instruction 105C handles the scenario where total size of the remaining elements at the very end of a loop is smaller than the alignment width. In an embodiment where the alignment width is the width of the vector register, this means that in the last vectorized loop operation the remaining elements do not fill up the entire vector register. That is, the KSUBREM instruction 105C can be used when there are not enough iterations in a loop (and not enough data elements in the array) to make up a full-width vector operation.

Consider an example in which each loop iteration processes one array element. Assume that each packet data register has 512 bits, which means 16 doubleword data elements can be packed into the register and processed together as a vector. If the total number of iterations is 100 and the beginning of the loop is aligned with the data store, there will be 4 remaining data elements at the end that are not processed in the vectorized loop and need to be handled separately. The KSUBREM instruction 105C computes the number of remaining data elements, and generates a mask that can be used with the remaining data elements to improve loop vectorization.

Figure 2A:
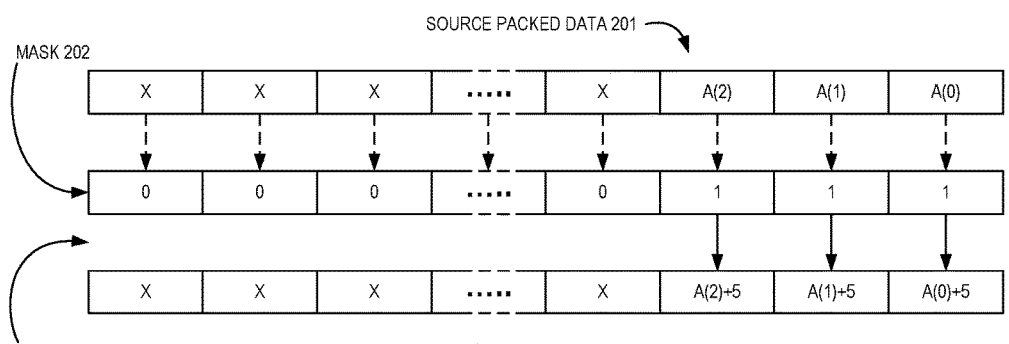
FIGS. 2A-2C illustrate examples of masked packed data operations that utilize the results of loop alignment instructions.

To further illustrate loop alignments, it may be helpful to consider a representative example of their use. FIG. 2A is a block diagram illustrating a first representative example embodiment of a masked packed data addition operation 203. The masked packed data addition operation 203 may be performed in response to, or as a result of, a masked packed data instruction (e.g., one of the masked packed data instructions 103 of FIG. 1). In one embodiment, a mask 202 is used in the operation 203. The mask 202 can be the result generated by a processor executing the PLMSK instruction 105B of FIG. 1.

In the example of FIG. 2A, the masked packed data addition operation 203 is to add a scalar value (e.g., 5) to each of the data elements of the source packed data 201 that corresponds to a set mask bit (e.g., 1). Suppose that a code sequence (for i=0 to 21, B(i)=A(i)+5) is specified for execution, the scalar value 5 is to be added to each data element of array A. Since the source packed data 201 contains three data elements of array A (i.e., A(0), A(1) and A(2)) as its lowest-order data elements, only the lowest-order three bits of the mask 202 are set (e.g., to 1) to indicate that the addition should be performed, and the results of the addition should be stored, for A(0), A(1) and A(2). In one embodiment, the mask 202 can be used for loading the source packed data 201 as well as performing the masked packed data addition operation 203. Alternatively, the mask 202 can be used after sixteen data elements (e.g., A(0) to A(15)) are loaded into a vector register to indicate that the addition should be performed on only the lowest-order three data elements. In either embodiment, the highest-order thirteen data element of array A will not be operated on by the addition; therefore, they are indicated as "x" (don't care).

Figure 2B:
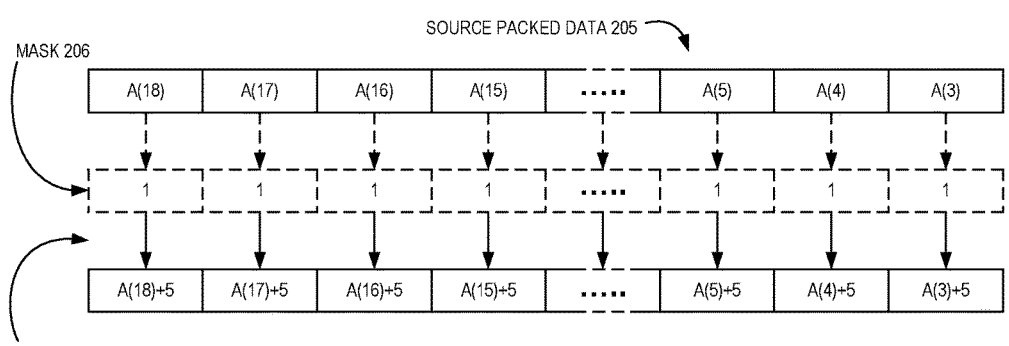
Figure 2C:
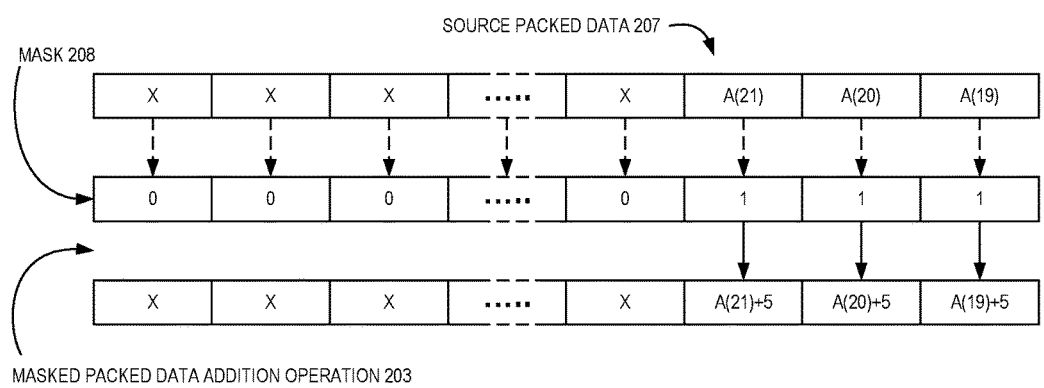

For the purpose of illustration, assume that the source packed data 201 is 512-bit wide and each of the data elements is 32-bit wide (i.e., a doubleword, or "Dword"). In the examples of FIGS. 2A-2C, the width of the source packed data 201 is the same as the alignment width. For optimizing data access and packed data operation, it is beneficial to align the base address of an array with the alignment width. For example, when the base address of an array stored in a cache is aligned with the cache line width, a processor can fetch a cache-line full of array data elements with a single fetch. Further, when the base address of an array stored in a packed data register is aligned with the packed data register width, a processor can vectorize operations on the array data elements efficiently.

As an example, the width of a cache line can be 512 bits, and the alignment width can be the width of a vector register. In a processor where the vector register is also 512-bit wide, loading a cache-line full of data (e.g., sixteen Dwords) into the vector register will take one load operation. However, in the example of FIG. 2A where the base address of array A is not aligned with the alignment width, loading the initial sixteen Dwords of the array A will take two load operations; first A(0) to A(2) from a first cache line, then A(3) to A(15) from a second cache line. If the width of a cache line is 512 bits and the alignment width (e.g., the vector register width) is 128-bit wide, loading aligned sixteen Dwords into the vector registers will take four load operations. However, in the example of FIG. 2A, loading the initial sixteen Dwords of the array A will take five load operations. This is because the initial sixteen Dwords are stored across two cache lines; as a result, loading them will cause an extra load operation.

In applications (e.g., image processing) where the number of array elements is a power of 2, the initial misalignment can lead to misalignments in all of the subsequent loads of the array elements. Thus, due to the initial misalignment, the entire array A may not be efficiently processed with packed data operations. Thus, in the example of FIG. 2A, the mask 202 is used to indicate to the processor that those elements of array A need to be processed separately from the remaining portion of the array elements.

In contrast, FIG. 2B shows an example in which a source packed data 205 contains the next sixteen elements of array A (i.e., A(3), A(4), . . . , A(18)). The total width of the sixteen elements is the same as the alignment width. Thus, a single packed data operation (e.g., vector fetch, vector add, etc.) can operate on all of these sixteen elements. If each of these sixteen elements is used in one loop iteration as a source operand for an instruction (e.g., for i=3 to 18, B(i)=A(i)+5)), the addition can be performed with a single packed data operation. In the example of FIG. 2B, a packed data operation mask 206 is shown to be used with the source packed data 205. All of the sixteen mask bits of mask 206 are set to indicate that all of the sixteen data elements of array A can be operated on and the results of operations can be stored. The mask 206 is shown in dotted lines because in some embodiments it can be advantageous not to use the mask 206. This is because by having all 1's as the mask bits, the operation on the source packet data 205 and the storage of the operation result are the same as not using the mask 206 in the operation.

In the example of FIG. 2C, the last three data elements of the array (i.e., A(19), A(20), A(21)) do not occupy the full width of a source packed data 207. That is, there are not enough elements left in A to fill the entire vector register 207. Since the source packed data 207 contains A(19), A(20), A(21) as its lowest-order data elements, only the lowest-order three bits of a mask 208 are set (e.g., to 1) to indicate that the addition should be performed, and the results of the addition should be stored, for A(19), A(20), A(21). The mask 208 can be the result generated by a processor executing the KSUBREM instruction 105C of FIG. 1. In one embodiment, the lack of data elements at the end of an array (for filling an entire vector register) can be a result of initial misalignment at the base address of the array. For example, in image processing applications, often times the size of the image array is an integer multiple of the vector register width. However, if the beginning of the image array is misaligned, a number of data elements may be left at the end of the loop that cannot fill the entire vector register.

The use of the masks 202 and 208 helps vectorize the execution of a loop in which data elements of an array are operands. In the examples of FIG. 2A, the iterations with the loop index i=0, 1 and 2 can be vectorized with a masked packed data operation in which the source packed data 201 is used with the mask 202. In the examples of FIG. 2C, the iterations with the loop index i=19, 20 and 21 can be vectorized with a masked packed data operation in which the source packed data 207 is used with the mask 208. In one embodiment, upon detecting a loop, a compiler can generate loop-optimizing code that includes one or more of the PLCNT instruction 105A, PLMSK instruction 105B, and/or KSUBREM instruction 105C. The output of the PLCNT instruction 105A is an integer number that indicates the number of iterations that can be taken out of the loop to improve vectorization; in the example of FIG. 2A, the number is three. The output of the PLMSK instruction 105B is a packed data operation mask (e.g., the mask 202) that can be applied to the source packed data 201. In the example of FIG. 2A, only the lowest-order three elements of the mask 202 are set (e.g., 1) and the rest are cleared (e.g., 0). The output of the KSUBREM instruction 105C is a packed data operation mask (e.g., the mask 208) that can be applied to the source packed data 207. In the example of FIG. 2C, only the lowest-order three elements of the mask 208 are set (e.g., 1) and the rest are cleared (e.g., 0).

The instruction for the illustrated masked packed data operation 203 indicates a source packed data to be added to a scalar value. Other masked packed data instructions may indicate two or more source packed data. The instruction of the masked packed data operation 203 also indicates a packed data operation mask (202, 206 or 208). Each of the packed data operation masks includes multiple mask elements, predicate elements, conditional control elements, or flags. The elements or flags may be included in a one-to-one correspondence with one or more corresponding source data elements. For example, as shown in the illustration, there may be one such element or flag for each corresponding source data element in the case of the operation involving one source packed data operand. Each element or flag of the packed data operation mask may be operable to mask a separate packed data operation on the one or more corresponding source packed data elements. For example, each element or flag may mask a separate packed data operation on a corresponding source packed data element.

As shown in the illustration, commonly each element or flag may be a single bit. A single bit may allow specifying either of two different possibilities (e.g., perform the operation versus do not perform the operation, store a result of the operation versus do not store a result of the operation, etc.). Alternatively, if selecting between more than two different options is desired, then two or more bits may be used for each flag or element. In the example of FIG. 2A, the packed data operation mask 202 includes sixteen bits. Each of the sixteen bits has an ordered correspondence to one of the sixteen corresponding data elements of the source packed data 201. For example, the three highest-order bits of the mask 202 correspond to the corresponding three highest-order data elements of the source packed data 201. In alternate embodiments, where the source packed data have either less or more data elements, the packed data operation mask may similarly have either less or more data elements.

According to the illustrated convention, when a given mask bit is set (i.e., 1), a result of the packed data operation is performed on a corresponding data element of the source packed data and stored in a corresponding data element of the packed data result. Conversely, when the given masking bit is cleared (i.e., 0), then the packed data operation is either omitted (i.e., not performed) for the corresponding data element of the source packed data, or the result is not allowed to be stored in the corresponding data element of the packed data result. Rather, another value (indicated by the symbol "X") may be stored in the result data element. For example, the numerical value of the corresponding data element from the source packed data is stored. In an alternative embodiment, a zero or another predetermined value may be stored in the corresponding data element of the packed data result. An opposite convention to that illustrated is also possible where bits are cleared (i.e., 0) to allow the results to be stored, or set (i.e., 1) to not allow the results to be stored.

In some embodiments, exceptions (e.g., exception flags) or violations may optionally be suppressed or not raised by a packed data operation on a masked-off element (i.e., a data element with a corresponding cleared mask bit). In some embodiments, for masked packed data instructions with a memory operand, memory faults may optionally be suppressed for masked-off data elements. This feature may help to implement control-flow predication, since the mask may in effect provide a merging behavior packed data registers, but is not required.

It is to be appreciated that a processor may support a wide variety of different types of masked packed data operations. For example, these may include those that have only one, or have more than two, source packed data, those that generate a result packed data of a different size, those that have different sized data elements, and/or those that have a different result data element order, and combinations thereof.

Figure 3:
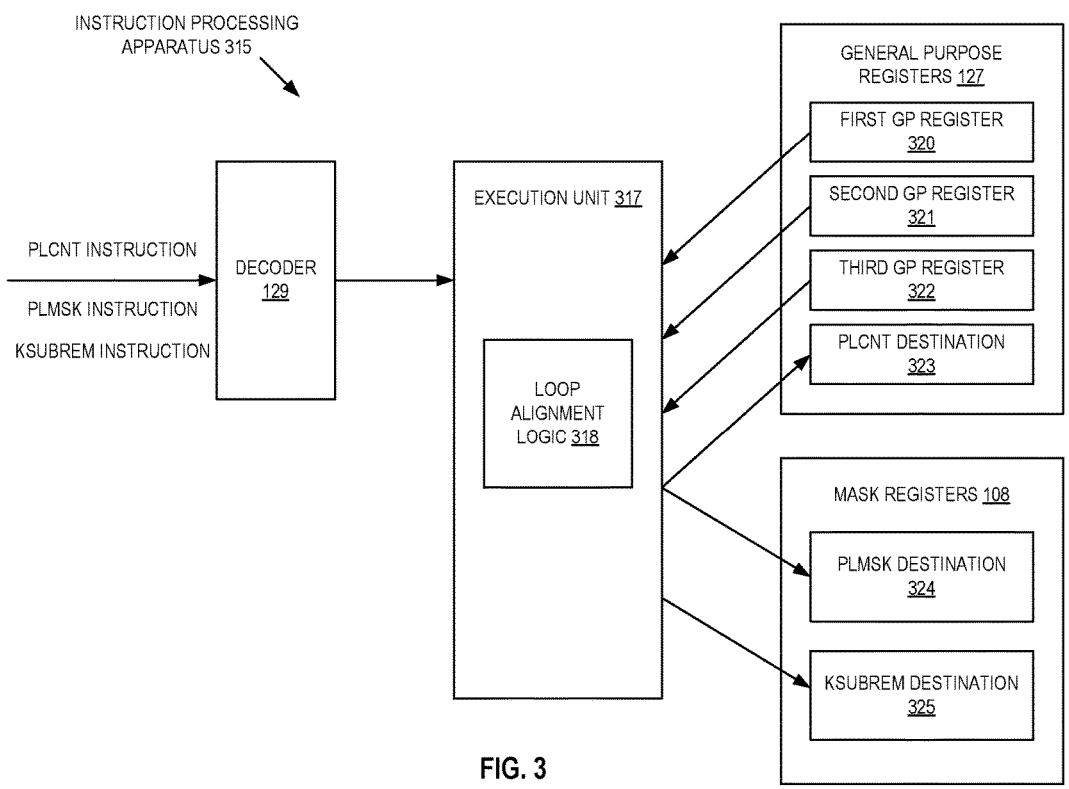
FIG. 3 is a block diagram of an example embodiment of an instruction processing apparatus having an execution unit that is operable to execute instructions including an example embodiment of one or more loop alignment instructions.

FIG. 3 is a block diagram of an example embodiment of an instruction processing apparatus 315 having an execution unit 317 that is operable to execute instructions including an example embodiment of the PLCNT instruction 105A, the PLMSK instruction 105B and the KSUBREM instruction 105C. In some embodiments, the instruction processing apparatus 315 may be a processor and/or may be included in a processor (e.g., the processor 100 of FIG. 1, or one similar). Alternatively, the instruction processing apparatus 315 may be included in a different processor, or electronic system.

The instruction processing apparatus 315 receives one or more of the PLCNT instruction 105A, the PLMSK instruction 105B and KSUBREM instruction 105C. The instructions may be received from memory, an instruction queue, an instruction fetch unit, or another source. Each of the instructions 105A, 105B and 105C may represent a machine instruction, macroinstruction, or control signal that is recognized by the instruction processing apparatus. The instruction processing apparatus 315 may have specific or particular circuitry or other logic (e.g., software combined with hardware and/or firmware) that is operable to process the instruction and/or store a result in response to, as a result of, or as specified by the instruction.

The illustrated embodiment of the instruction processing apparatus 315 includes an instruction decoder, such as the decoder 129 of FIG. 1, or one similar. The decoder 129 receives and decodes higher-level machine instructions or macroinstructions, such as the received instructions 105A-105C. The decoder 129 may generate and output one or more lower-level micro-operations, micro-code entry points, microinstructions, or other lower-level instructions or control signals, which reflect and/or are derived from the original higher-level instruction. The one or more lower-level instructions or control signals may implement the operation of the higher-level instruction through one or more lower-level (e.g., circuit-level or hardware-level) operations. The decoder 129 may be implemented using various different mechanisms. Examples of suitable mechanisms include, but are not limited to, microcode random access memories (ROMs), look-up tables, hardware implementations, programmable logic arrays (PLAs), other mechanisms used to implement decoders known in the art, etc.

Alternatively, rather than having the decoder 129, in one or more other embodiments, the instruction processing apparatus 315 may instead have an instruction emulator, translator, morpher, interpreter, or other instruction conversion logic. Various different types of instruction conversion logic are known in the arts and may be implemented in software, hardware, firmware, or a combination thereof. The instruction conversion logic may receive one or more of the instructions 105A-105C, emulate, translate, morph, interpret, or otherwise convert it into one or more corresponding derived instructions or control signals. In still other embodiments, the instruction processing apparatus 315 may have both a decoder and additional instruction conversion logic. For example, the instruction processing apparatus 315 may have instruction conversion logic to convert one or more of the instructions 105A-105C into one or more intermediate instructions, and a decoder to decode the one or more intermediate instructions into one or more lower-level instructions or control signals executable by native hardware of the instruction processing apparatus. Some or all of the instruction conversion logic may be located off-die from the rest of the instruction processing apparatus, such as on a separate die or in an off-die memory.

Referring again to FIG. 3, the instruction processing apparatus 315 also includes a first general purpose (GP) register 320 that is operable to store a base address (which is the starting address of an array to be aligned) and a second general purpose register 321 that is operable to store a loop limit (which is the total number of iterations in the loop). The first and second general purpose registers 320 and 321 supply input to the PLCNT instruction 105A and the PLMSK instruction 105B. In one embodiment, the instruction processing apparatus 315 also includes a third general purpose register 322 that is operable to store a current iteration count (which indicates where vector processing stops). The second and third general purpose registers 321 and 322 supply input to the KSUBREM instruction 105C. As previously mentioned, the loop alignment instructions may explicitly specify (e.g., through bits or one or more fields) or otherwise indicate the registers that supply the input, and a destination. The destination of the PLCNT instruction 105A (PLCNT destination 323) is also a general purpose register. The destination of the PLMSK instruction 105B (PLMSK destination 324) is one of the mask registers 108. The destination of the KSUBREM instruction 105C (KSUBREM destination 325) is also one of the mask registers 108. Alternatively, the destination storage location may be another register or memory location.

In some embodiments, each of the PLCNT instruction 105A and the PLMSK instruction 105B specifies or indicates an additional operand of an immediate value. The immediate value represents the alignment width. In alternative embodiments, the instructions do not specify an immediate value and instead use a predetermined value (e.g., the maximum alignment width allowed by the underlying microarchitecture, such as 512 bits) as the alignment width.

The registers 320-325 may each represent an on-board processor storage location, such as the architectural registers 106 of FIG. 1. The registers 320-325 may be visible to the software and/or programmer (e.g., software-visible) and/or may be registers that are indicated or specified by macroinstructions to identify operands. The registers 320-325 may be implemented in different ways in different microarchitectures using well known techniques and are not limited to any known particular type of circuit. Various different types of registers are suitable as long as they are capable of storing and providing data as described herein. Examples of suitable types of registers include, but are not limited to, dedicated physical registers, dynamically allocated physical registers using register renaming, and combinations thereof.

The instruction processing apparatus 315 also includes the execution unit 317. The execution unit 317 is coupled with the registers 320-325. The execution unit 317 is also coupled with the decoder 129. The execution unit 317 may receive from the decoder 129 one or more micro-operations, micro-code entry points, microinstructions, other instructions, or other control signals, which reflect, or are derived from the PLCNT instruction 105A, the PLMSK instruction 105B and the KSUBREM instruction 105C.

The execution unit 317 is operable, in response to and/or as a result of each of the loop alignment instructions, to store a result in the destination. By way of example, the execution unit 317 may include an arithmetic logic unit, logic unit, arithmetic unit, functional unit, or the like. The execution unit 317 may include loop alignment logic 318 operable to compute the number of peel iterations. The execution unit 317 and/or the loop alignment logic 318 may include circuitry or other execution logic (e.g., software, firmware, hardware, or a combination) operable to implement the operation of the instruction (e.g., execute one or more microinstructions).

In some embodiments, the execution unit may further be operable to zero bits of the destination that are not used to store the masks, or alternatively give these bits another predetermined value.

To avoid obscuring the description, a relatively simple instruction processing apparatus 315 has been shown and described. It is to be appreciated that other embodiments may have more than one execution unit. For example, the apparatus may include multiple different types of execution units, such as, for example, arithmetic units, arithmetic logic units (ALUs), integer units, floating point units, etc. At least one of these units may be responsive to an embodiment of a loop alignment instruction as disclosed herein. Still other embodiments of instruction processing apparatus or processors may have multiple cores, logical processors, or execution engines. An execution unit operable to execute one or more loop alignment instructions may be included within at least one, at least two, most, or all of the cores, logical processors, or execution engines.

The instruction processing apparatus 315 or processor may also optionally include one or more other well-known components. For example, other embodiments may include one or more of instruction fetch logic, scheduling logic, branch prediction logic, instruction and data caches, instruction and data translation lookaside buffers, prefetch buffers, microinstruction queues, microinstruction sequencers, bus interface units, second or higher level caches, instruction scheduling logic, retirement logic, register renaming logic, and the like, and various combinations thereof. It is to be appreciated that there are literally numerous different combinations and configurations of such components in processors, and that the scope of the invention is not limited to any known such combination or configuration.

Figures 4, 5A, 5B:
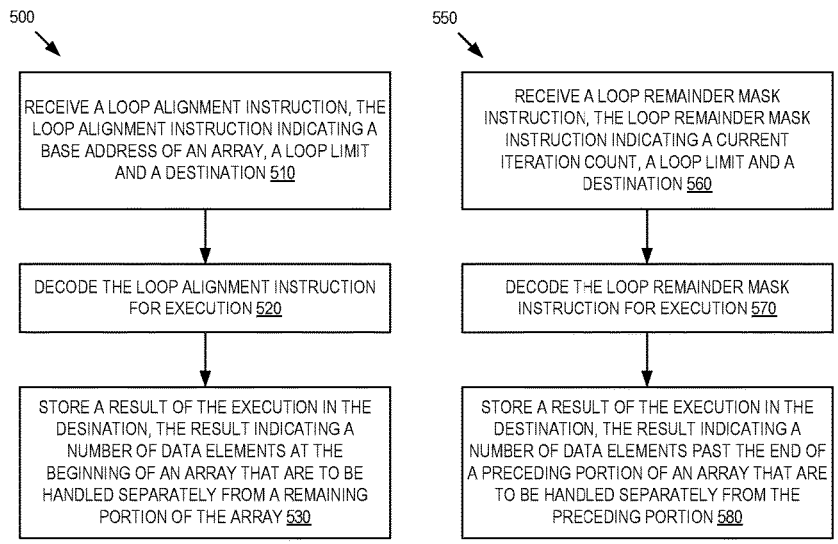
FIG. 4 is a block diagram of an article of manufacture (e.g., a computer program product) including a tangible, non-transitory machine-accessible and/or machine-readable storage medium storing one or more loop alignment instructions.
FIGS. 5A and 5B are flow diagrams illustrating example embodiments of methods for processing loop alignment instructions.

FIG. 4 is a block diagram of an article of manufacture (e.g., a computer program product) including a tangible, non-transitory machine-readable (e.g., machine-accessible) storage medium 400 that stores one or more loop alignment instructions 405 (e.g., the PLCNT instruction 105A, the PLMSK instruction 105B, and/or the KSUBREM instruction 105C of FIG. 1). It is to be appreciated that other instructions or sequences of instructions to perform one or more operations or methods as disclosed herein (e.g., one or more instructions using the result of the loop alignment instruction 405 as a predicate operand, a closely affiliated scalar or packed data instruction, or a routine or algorithm using the loop alignment instructions 405) may also be stored on the storage medium 400.

In various embodiments, the tangible non-transitory machine-readable storage medium 400 may include a floppy diskette, an optical storage medium, an optical disk, a CD-ROM, a magnetic disk, a magneto-optical disk, a read only memory (ROM), a programmable ROM (PROM), an erasable-and-programmable ROM (EPROM), an electrically-erasable-and-programmable ROM (EEPROM), a random access memory (RAM), a static-RAM (SRAM), a dynamic-RAM (DRAM), a Flash memory, a phase-change memory, or a combinations thereof. The tangible medium may include one or more tangible solid materials, such as, for example, a semiconductor material, a phase-change material, a magnetic material, an optically transparent solid material of an optical disc, etc.

Examples of suitable machines include, but are not limited to, instruction processing devices, instruction execution devices, processors, and various electronic devices having one or more instruction processing devices, instruction execution devices, or processors. A few representative examples of such electronic devices include, but are not limited to, computer systems, desktops, laptops, notebooks, servers, network devices, routers, switches, netbooks, nettops, Mobile Internet devices (MIDs), cellular phones, and media players. Such electronic devices typically include one or more processors coupled with one or more other components, such as, for example, one or more tangible non-transitory machine-readable storage mediums. The coupling of the processors and other components is typically through one or more busses and bridges (also termed bus controllers). Thus, the storage device or storage mediums of an electronic device may store instructions and/or instruction sequences for execution on the one or more processors of that electronic device.

FIG. 5A is a block flow diagram of an example embodiment of a method 500 of processing an example embodiment of a loop alignment instruction (e.g., the PLCNT instruction 105A and/or the PLMSK instruction 105B of FIG. 1). In various embodiments, the method 500 may be performed by a general-purpose processor, a special-purpose processor (e.g., a graphics processor or a digital signal processor), or another type of digital logic device or instruction processing apparatus. In some embodiments, the method 500 may be performed by the processor 100 of FIG. 1, or the instruction processing apparatus 315 of FIG. 3, or a similar processor or instruction processing apparatus. Alternatively, the method 500 may be performed by different embodiments of processors or instruction processing apparatus. Moreover, the processor 100 of FIG. 1, and the instruction processing apparatus 315 of FIG. 3, may perform embodiments of operations and methods either the same as, similar to, or different than those of the method 500 of FIG. 5A.

The method 500 includes a processor receiving a loop alignment instruction, such as the PLCNT instruction 105A or the PLMSK instruction 105B (block 510). The loop alignment instruction specifies or indicates a first source operand, a second source operand, a destination and a data element size of an array. In one embodiment, the first source operand specifies a first register in which the base address of the array is stored, and the second source operand specifies a second register in which a loop limit (that is, the total number of iterations in a loop) is stored. In some embodiments, the width of each array data element is specified by a mnemonic as part of the instruction name (e.g., a data element width of a byte can be indicated by the names of the instructions such as PLCNTB and PLMSKB). In some embodiments, the instruction also specifies or indicates an immediate value, which is the requested alignment width to which the array is to be aligned. In various aspects, the instruction may be received at a processor, an instruction processing apparatus, or a portion thereof (e.g., a decoder, instruction converter, etc.). In various aspects, the loop alignment instruction may be received from an off-processor source (e.g., from a main memory, a disc, or a bus or interconnect), or from an on-processor source (e.g., from an instruction cache).

Then, the loop alignment instruction is decoded for execution (block 520). The decoding can be performed by decoder circuitry within a processor. In some embodiments, the loop alignment instruction can be converted for decoding by the instruction conversion logic described above in connection with the decoder 129 shown in FIG. 3.

After the loop alignment instruction is executed, a result of the execution is stored in the destination (block 530). The result indicates the number of data elements at the beginning of the array that are to be handled separately from a remaining portion of the array. Loop alignment is achieved when the base address (that is, the starting address) of the remaining portion of the array aligns with an alignment width (such as the requested alignment width).

In one embodiment, the result indicates the number of data elements as an integer value (such as in the case of the PLCNT instruction 105A). In another embodiment, the result indicates the number of data elements as mask elements that are set to a predetermined value (e.g., 1) (such as in the case of the PLMSK instruction 105B).

FIG. 5B is a block flow diagram of an example embodiment of a method 550 of processing an example embodiment of a loop alignment instruction (e.g., the KSUBREM instruction 105C of FIG. 1). In various embodiments, the method 550 may be performed by a general-purpose processor, a special-purpose processor (e.g., a graphics processor or a digital signal processor), or another type of digital logic device or instruction processing apparatus. In some embodiments, the method 550 may be performed by the processor 100 of FIG. 1, or the instruction processing apparatus 315 of FIG. 3, or a similar processor or instruction processing apparatus. Alternatively, the method 550 may be performed by different embodiments of processors or instruction processing apparatus. Moreover, the processor 100 of FIG. 1, and the instruction processing apparatus 315 of FIG. 3, may perform embodiments of operations and methods either the same as, similar to, or different than those of the method 550 of FIG. 5B.

The method 550 includes a processor receiving a loop alignment instruction, such as the KSUBREM instruction 105C (block 560). The loop alignment instruction specifies or indicates a first source operand, a second source operand, a destination and a data element size of an array. In one embodiment, the first source operand specifies a first register in which a current iteration count (that is, where vector processing of a loop) is stored, and the second source operand specifies a second register in which a loop limit (that is, the total number of iterations in a loop) is stored. In some embodiments, the width of each array data element is specified by a mnemonic as part of the instruction name (e.g., a data element width of a byte can be indicated by the names of the instructions such as KSUBREMB). In various aspects, the instruction may be received at a processor, an instruction processing apparatus, or a portion thereof (e.g., a decoder, instruction converter, etc.). In various aspects, the loop alignment instruction may be received from an off-processor source (e.g., from a main memory, a disc, or a bus or interconnect), or from an on-processor source (e.g., from an instruction cache).

Then, the loop alignment instruction is decoded for execution (block 570). The decoding can be performed by decoder circuitry within a processor. In some embodiments, the loop alignment instruction can be converted for decoding by the instruction conversion logic described above in connection with the decoder 129 shown in FIG. 3.

After the loop alignment instruction is executed, a result of the execution is stored in the destination (block 580). The result indicates the number of data elements at the end of the array that are to be handled separately from a preceding portion of the array. The end of the preceding portion of the array is where the vector processing stop and the current iteration count is recorded.

In one embodiment, the result indicates the number of data elements as mask elements that are set to a predetermined value (e.g., 1) (such as in the case of the KSUBREM instruction 105C). In alternative embodiment, the result can also indicate the number of data elements as an integer value.

The illustrated method includes operations that are visible from outside a processor or instruction processing apparatus (e.g., from a software perspective). In other embodiments, the method may optionally include one or more other operations (e.g., one or more operations occurring internally within the processor or instruction processing apparatus). By way of example, after the instruction is received, the instruction may be decoded, translated, emulated, or otherwise converted, into one or more other instructions or control signals. The first and second source operands may be accessed and/or received. An execution unit may be enabled to generate or perform the loop alignment according to the instruction, and may generate or perform the loop alignment.

Figures 6, 7:
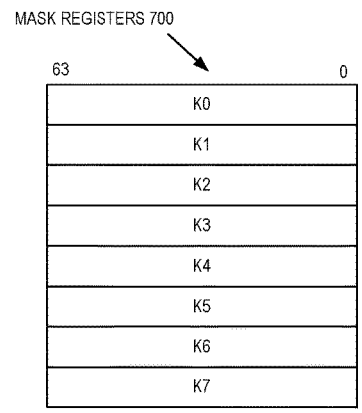
FIG. 6 is a table illustrating that the number of packed data operation mask bits depends upon an alignment width and a data element width.
FIG. 7 is a block diagram of an example embodiment of a set of packed data operation mask registers.

FIG. 6 is a table 600 illustrating the number of packed data operation mask bits generated by the PLMSK instruction 105B and the KSUBREM instruction 105C for different combinations of alignment widths and packed data element widths. The number of packed data operation mask bits is a ratio of a given alignment width and a given packed data (e.g., array) element width. Alignment widths of 64-bits, 128-bits, 256-bits, and 512-bits are shown, although other sizes are also possible. Packed data element widths of 8-bit bytes (B), 16-bit words (W), 32-bit doublewords (D) or single precision floating point, and 64-bit quadwords (Q) or double precision floating point are considered, although other widths are also possible.

FIG. 7 is a block diagram of an example embodiment of a set of mask registers 700 (such as the mask registers 108 of FIG. 1). Each of the mask registers 700 can be used to store a packed data operation mask (such as the masks stored in the PLMSK destination 324 and the KSUBREM destination 325). In the illustrated embodiment, the set includes eight mask registers labeled k0 through k7. Alternate embodiments may include either fewer than eight (e.g., two, four, six, etc.) or more than eight (e.g., sixteen, twenty, thirty-two, etc.) packed data operation mask registers. In the illustrated embodiment, each of the mask registers 700 is 64-bits wide. In alternate embodiments, the widths of the mask registers 700 may be either wider than 64-bits (e.g., 80-bits, 128-bits, etc.) or narrower than 64-bits (e.g., 8-bits, 16-bits, 32-bits, etc). The mask registers 700 may be implemented in different ways using well known techniques and are not limited to any known particular type of circuit. Various different types of registers are suitable as long as they are capable of storing and providing data as described herein. Examples of suitable registers include, but are not limited to, dedicated physical registers, dynamically allocated physical registers using register renaming, and combinations thereof.

In some embodiments, the mask registers 700 may be a separate, dedicated set of architectural registers. In some embodiments, the instructions may encode or specify the mask registers in different bits or one or more different field combinations of an instruction format than that used to encode or specify other types of registers (e.g., mask registers 108 of FIG. 1). By way of example, the masked packed data instructions may use three bits (e.g., a 3-bit field) to encode or specify any one of the eight packed data operation mask registers k0 through k7. In alternate embodiments, either fewer or more bits may be used when there are fewer or more packed data operation mask registers, respectively. In one particular implementation, only mask registers k1 through k7 (but not k0) may be addressed as a predicate operand to predicate a masked packed data operation. The register k0 may be used as a regular source or destination, but may not be encoded as a predicate operand (e.g., if k0 is specified it has an all ones or "no mask" encoding). In other embodiments, either all or only some of the registers may be encoded as a predicate operand.

In some embodiments, the lowest-order subset or portion of the registers 700 is used for mask, although this is not required. As shown in FIG. 6, when the alignment width is 128 bits and the data element width is 8 bits, 16 mask bits is used. These 16 mask bits can be the lowest-order 16 bits stored in one of the registers 700 (e.g., k1). The higher-order portion of k1 can be set to zeros or other predetermined value. In alternate embodiments a highest-order subset, or some other subset, may optionally be used.

FIGS. 8A-8C illustrate embodiments of the PLCNT instruction 105A, the PLMSK instruction 105B and the KSUBREM instruction 105C, respectively, as well as the operations thereof. The name of each instruction can have a mnemonic B/W/D/Q appended thereto to indicate the data element width; e.g., B (8 bits), W (16 bits), D (32 bits) or Q (64 bits). In these figures, rax, rbx, rcx represent general purpose registers and k1 represents a mask register. In the examples of FIGS. 8A and 8B (PLCNT and PLMSK), rbx (storing SRC1) is a first source operand having the base address of an array, rcx (storing SRC2) is a second source operand having a loop limit, rax (storing DEST) represents a destination of the result. VL represents the requested alignment width in bytes, w represents the width of each data element in the array (i.e., 1, 2, 4 or 8 bytes, as indicated by B/W/D/Q appended to the instruction name). In some embodiments, the instructions specify an immediate that can be used to set the value of VL; e.g., 00, 01 and 10, which may represent 128 bits, 256 bits, 512 bits, respectively. Some of the immediate values can be reserved; e.g., 11 may represent 1024 bits. It is understood that any distinct immediate values can be used to represent the different alignment widths. In alternative embodiments, the instructions do not specify an immediate and instead use a predetermined value (e.g., the maximum alignment width allowed by the underlying microarchitecture, such as 512 bits) as the value of VL. Further, in the examples of FIGS. 8A and 8B, alignment_iterations represent the number of iterations to reach alignment. This number is smaller than the iteration limit specified in SRC2. In the example of FIG. 2A, this number is three.

As shown, the PLCNT instruction returns a count corresponding to the minimum of alignment_iterations and SRC2 (iteration limit). The PLMSK instruction returns a packed data operation mask that is equivalent to the count returned by PLCNT. The example of FIG. 8B shows that the mask can be generated by the shifting the value 1 by n bits and then minus 1, where n represents the count (that can be generated by PLCNT). The resulting mask is stored into the destination, which can be one of the packed data operation mask registers 700 of FIG. 7. It is understood that the examples herein are illustrative and non-limiting, as there can be multiple different ways for implementing PLCNT and PLMSK.

In the example of FIG. 8C (KSUBREM), rbx (storing SRC1) is a first source operand having the current iteration count, rcx (storing SRC2) is a second source operand having a loop limit of a loop, k1 (storing DEST) represents a destination of the result. VL here represents the number of vector elements, and remaining_iterations represents the minimum of VL and the difference between SRC2 and SRC1. The resulting mask can be generated by the shifting the value 1 by n bits and then minus 1, where n is the value of remaining_iterations.

The loop alignment instructions disclosed herein are general-purpose instructions that have general uses. For example, these instructions may be used, either alone or in combination with other instructions, to calculate the number of peel iterations. In some embodiments, the loop alignment instructions disclosed herein may be used in conjunction with a closely affiliated or associated packed data instruction to optimize the execution of loop operations. Other uses are also contemplated based on the present disclosure.

Exemplary Computer Systems and Processors—FIGS. 9-13

FIGS. 9-13 are exemplary computer systems and processors. Other system designs and configurations known in the arts for laptops, desktops, handheld PCs, personal digital assistants, engineering workstations, servers, network devices, network hubs, switches, embedded processors, digital signal processors (DSPs), graphics devices, video game devices, set-top boxes, micro controllers, cell phones, portable media players, hand held devices, and various other electronic devices, are also suitable. In general, a huge variety of systems or electronic devices capable of incorporating a processor and/or other execution logic as disclosed herein are generally suitable.

Figure 9:
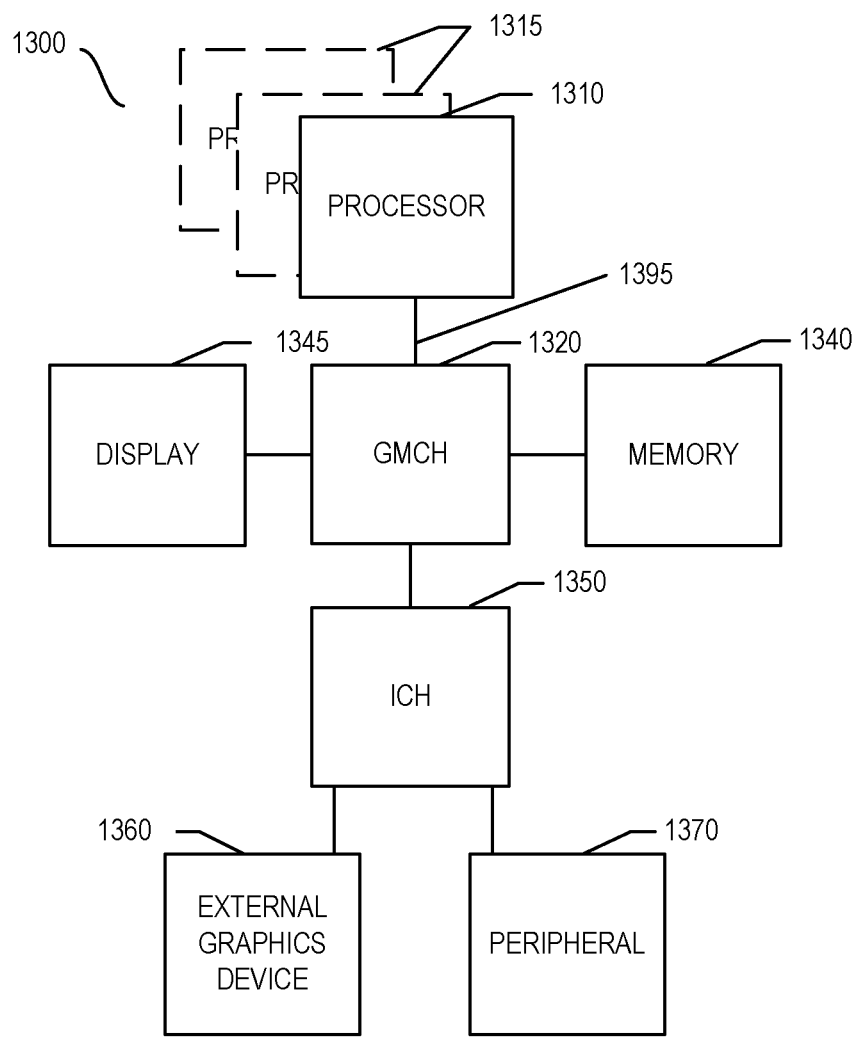
FIG. 9 is a block diagram of a system in accordance with one embodiment of the invention.

Referring now to FIG. 9, shown is a block diagram of a system 1300 in accordance with one embodiment of the invention. The system 1300 may include one or more processors 1310, 1315, which are coupled to graphics memory controller hub (GMCH) 1320. The optional nature of additional processors 1315 is denoted in FIG. 9 with broken lines.

Each processor 1310, 1315 may be some version of processor 1700. However, it should be noted that it is unlikely that integrated graphics logic and integrated memory control units would exist in the processors 1310, 1315.

FIG. 9 illustrates that the GMCH 1320 may be coupled to a memory 1340 that may be, for example, a dynamic random access memory (DRAM). The DRAM may, for at least one embodiment, be associated with a non-volatile cache.

The GMCH 1320 may be a chipset, or a portion of a chipset. The GMCH 1320 may communicate with the processor(s) 1310, 1315 and control interaction between the processor(s) 1310, 1315 and memory 1340. The GMCH 1320 may also act as an accelerated bus interface between the processor(s) 1310, 1315 and other elements of the system 1300. For at least one embodiment, the GMCH 1320 communicates with the processor(s) 1310, 1315 via a multi-drop bus, such as a frontside bus (FSB) 1395.

Furthermore, GMCH 1320 is coupled to a display 1345 (such as a flat panel display). GMCH 1320 may include an integrated graphics accelerator. GMCH 1320 is further coupled to an input/output (I/O) controller hub (ICH) 1350, which may be used to couple various peripheral devices to system 1300. Shown for example in the embodiment of FIG. 9 is an external graphics device 1360, which may be a discrete graphics device coupled to ICH 1350, along with another peripheral device 1370.

Alternatively, additional or different processors may also be present in the system 1300. For example, additional processor(s) 1315 may include additional processors(s) that are the same as processor 1310, additional processor(s) that are heterogeneous or asymmetric to processor 1310, accelerators (such as, e.g., graphics accelerators or digital signal processing (DSP) units), field programmable gate arrays, or any other processor. There can be a variety of differences between the physical resources 1310, 1315 in terms of a spectrum of metrics of merit including architectural, microarchitectural, thermal, power consumption characteristics, and the like. These differences may effectively manifest themselves as asymmetry and heterogeneity amongst the processing elements 1310, 1315. For at least one embodiment, the various processing elements 1310, 1315 may reside in the same die package.

Figure 10:
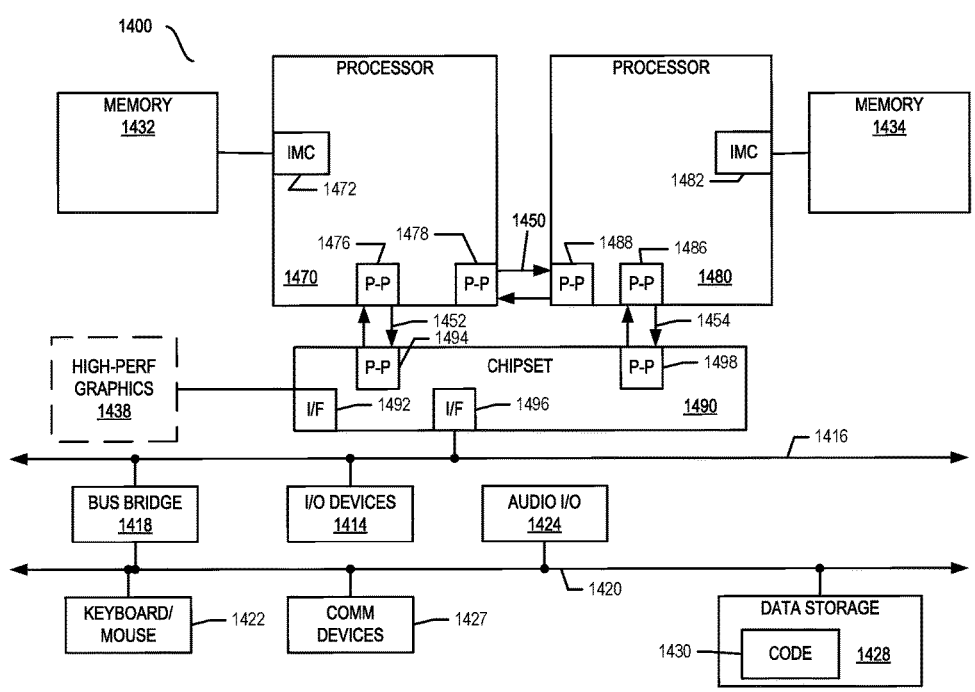
FIG. 10 is a block diagram of a second system in accordance with an embodiment of the invention.

Referring now to FIG. 10, shown is a block diagram of a second system 1400 in accordance with an embodiment of the present invention. As shown in FIG. 10, multiprocessor system 1400 is a point-to-point interconnect system, and includes a first processor 1470 and a second processor 1480 coupled via a point-to-point interconnect 1450. As shown in FIG. 10, each of processors 1470 and 1480 may be some version of the processor 1700.

Alternatively, one or more of processors 1470, 1480 may be an element other than a processor, such as an accelerator or a field programmable gate array.

While shown with only two processors 1470, 1480, it is to be understood that the scope of the present invention is not so limited. In other embodiments, one or more additional processing elements may be present in a given processor.

Processor 1470 may further include an integrated memory controller hub (IMC) 1472 and point-to-point (P-P) interfaces 1476 and 1478. Similarly, second processor 1480 may include an IMC 1482 and P-P interfaces 1486 and 1488. Processors 1470, 1480 may exchange data via a point-to-point (PtP) interface 1450 using PtP interface circuits 1478, 1488. As shown in FIG. 10, IMC's 1472 and 1482 couple the processors to respective memories, namely a memory 1432 and a memory 1434, which may be portions of main memory locally attached to the respective processors.

Processors 1470, 1480 may each exchange data with a chipset 1490 via individual P-P interfaces 1452, 1454 using point to point interface circuits 1476, 1494, 1486, 1498. Chipset 1490 may also exchange data with a high-performance graphics circuit 1438 via a high-performance graphics interface 1492.

A shared cache (not shown) may be included in either processor outside of both processors, yet connected with the processors via P-P interconnect, such that either or both processors' local cache information may be stored in the shared cache if a processor is placed into a low power mode.

Chipset 1490 may be coupled to a first bus 1416 via an interface 1496. In one embodiment, first bus 1416 may be a Peripheral Component Interconnect (PCI) bus, or a bus such as a PCI Express bus or another third generation I/O interconnect bus, although the scope of the present invention is not so limited.

As shown in FIG. 10, various I/O devices 1414 may be coupled to first bus 1416, along with a bus bridge 1418 which couples first bus 1416 to a second bus 1420. In one embodiment, second bus 1420 may be a low pin count (LPC) bus. Various devices may be coupled to second bus 1420 including, for example, a keyboard/mouse 1422, communication devices 1427 and a data storage unit 1428 such as a disk drive or other mass storage device which may include code 1430, in one embodiment. Further, an audio I/O 1424 may be coupled to second bus 1420. Note that other architectures are possible. For example, instead of the point-to-point architecture of FIG. 10, a system may implement a multi-drop bus or other such architecture.

Figure 11:
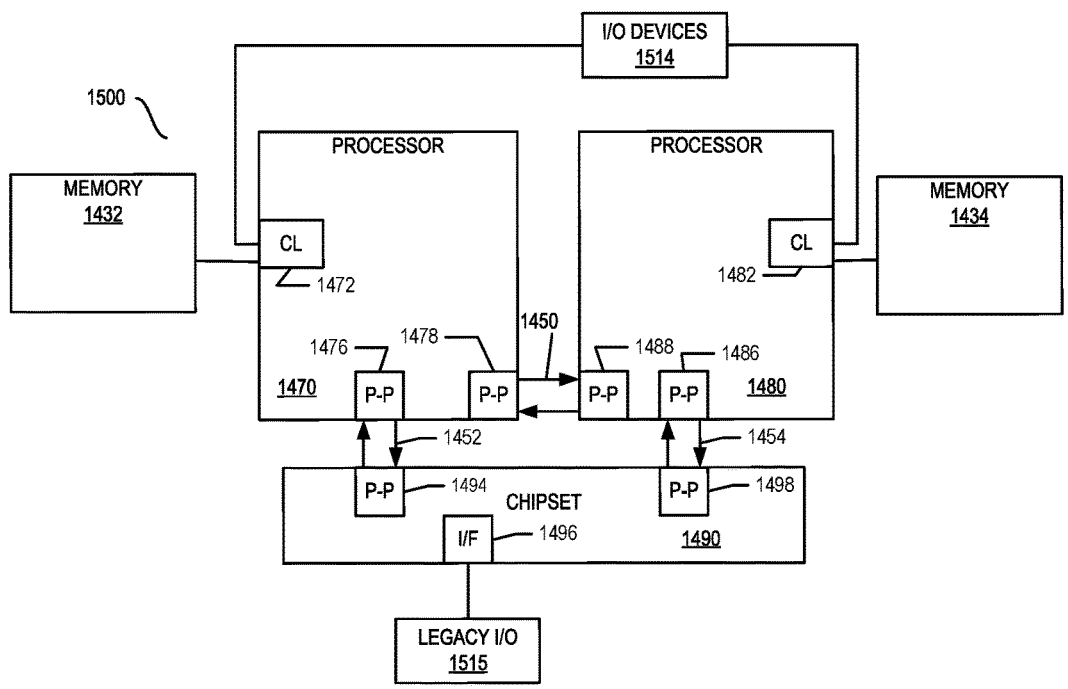
FIG. 11 is a block diagram of a third system in accordance with an embodiment of the invention.

Referring now to FIG. 11, shown is a block diagram of a third system 1500 in accordance with an embodiment of the present invention. Like elements in FIGS. 10 and 11 bear like reference numerals, and certain aspects of FIG. 10 have been omitted from FIG. 11 in order to avoid obscuring other aspects of FIG. 11.

FIG. 11 illustrates that the processing elements 1470, 1480 may include integrated memory and I/O control logic ("CL") 1472 and 1482, respectively. For at least one embodiment, the CL 1472, 1482 may include memory controller hub logic (IMC) such as that described above in connection with FIG. 10. In addition, CL 1472, 1482 may also include I/O control logic. FIG. 11 illustrates that not only are the memories 1432, 1434 coupled to the CL 1472, 1482, but also that I/O devices 1514 are also coupled to the control logic 1472, 1482. Legacy I/O devices 1515 are coupled to the chipset 1490.

Figure 12:
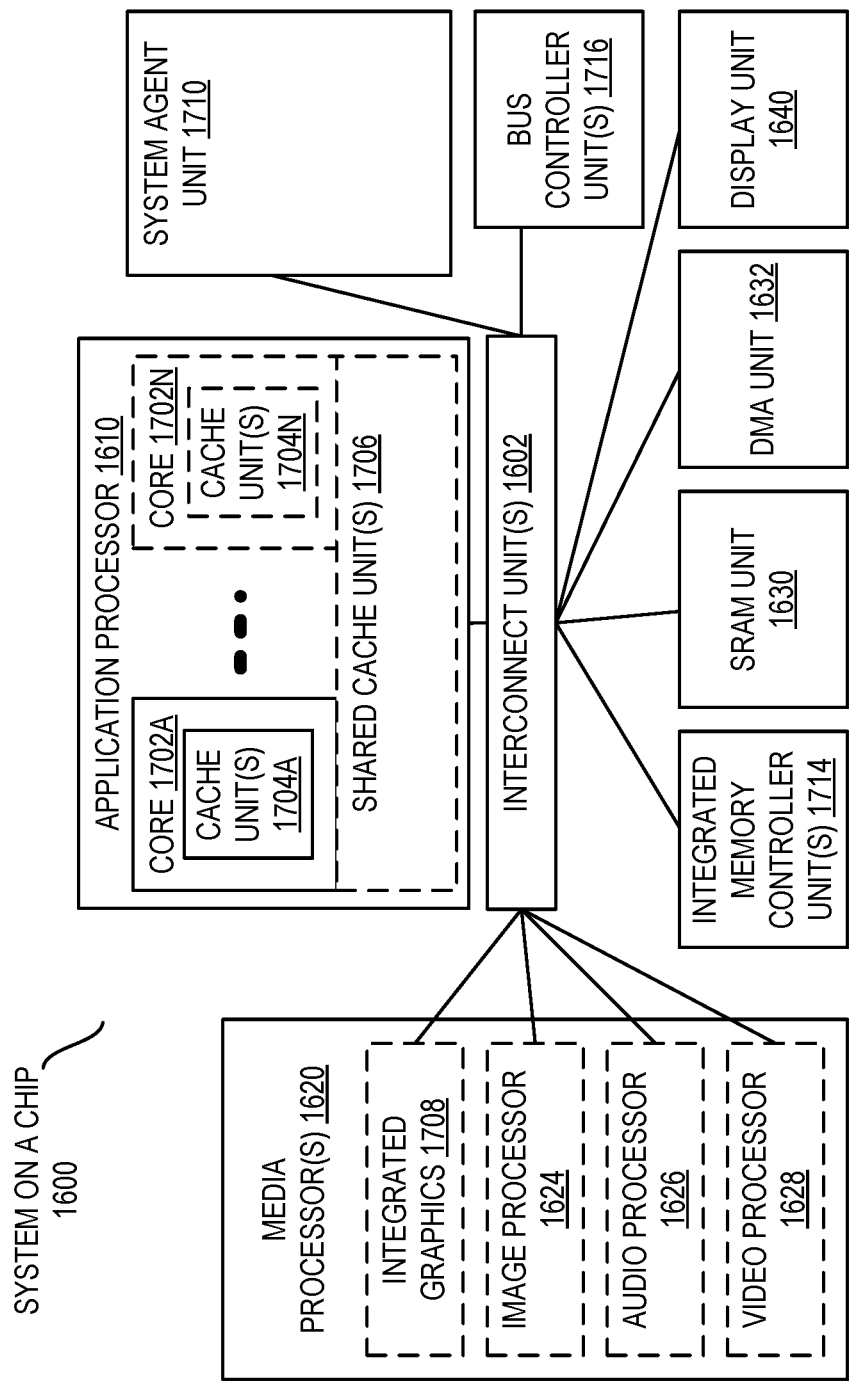
FIG. 12 is a block diagram of a system-on-a-chip (SoC) in accordance with an embodiment of the invention.
Figure 13:
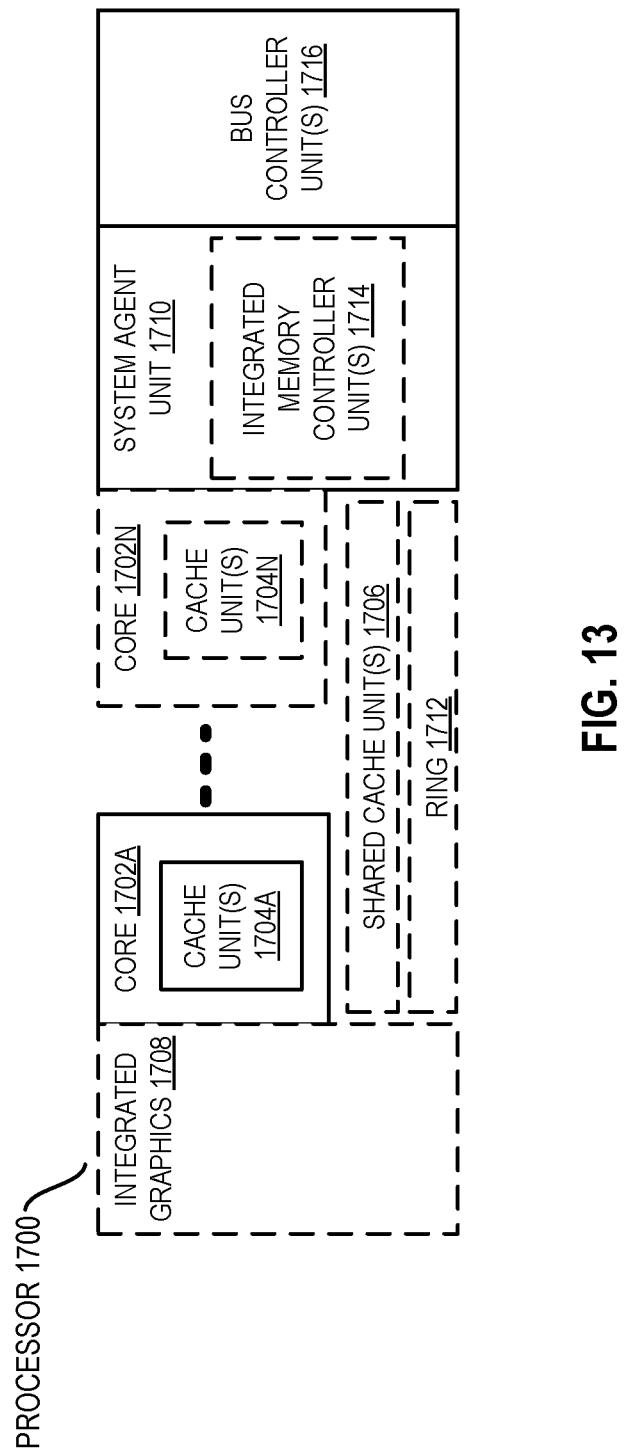
FIG. 13 is a block diagram of a single core processor and a multicore processor with integrated memory controller and graphics according to embodiments of the invention.

Referring now to FIG. 12, shown is a block diagram of a SoC 1600 in accordance with an embodiment of the present invention. Similar elements in FIG. 13 bear like reference numerals. FIG. 13 shows ring 1712 optionally included in processor 1700. Also, dashed lined boxes are optional features on more advanced SoCs. In FIG. 12, an interconnect unit(s) 1602 is coupled to: an application processor 1610 which includes a set of one or more cores 1702A-N, cache units 1704A-N, and shared cache unit(s) 1706; a system agent unit 1710; a bus controller unit(s) 1716; an integrated memory controller unit(s) 1714; a set or one or more media processors 1620 which may include integrated graphics logic 1708, an image processor 1624 for providing still and/or video camera functionality, an audio processor 1626 for providing hardware audio acceleration, and a video processor 1628 for providing video encode/decode acceleration; a static random access memory (SRAM) unit 1630; a direct memory access (DMA) unit 1632; and a display unit 1640 for coupling to one or more external displays.

Embodiments of the mechanisms disclosed herein may be implemented in hardware, software, firmware, or a combination of such implementation approaches. Embodiments of the invention may be implemented as computer programs or program code executing on programmable systems comprising at least one processor, a storage system (including volatile and non-volatile memory and/or storage elements), at least one input device, and at least one output device.

Program code may be applied to input data to perform the functions described herein and generate output information. The output information may be applied to one or more output devices, in known fashion. For purposes of this application, a processing system includes any system that has a processor, such as, for example; a digital signal processor (DSP), a microcontroller, an application specific integrated circuit (ASIC), or a microprocessor.

The program code may be implemented in a high level procedural or object oriented programming language to communicate with a processing system. The program code may also be implemented in assembly or machine language, if desired. In fact, the mechanisms described herein are not limited in scope to any particular programming language. In any case, the language may be a compiled or interpreted language.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

Such machine-readable storage media may include, without limitation, non-transitory, tangible arrangements of articles manufactured or formed by a machine or device, including storage media such as hard disks, any other type of disk including floppy disks, optical disks (compact disk read-only memories (CD-ROMs), compact disk rewritables (CD-RWs)), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), magnetic or optical cards, or any other type of media suitable for storing electronic instructions.

Accordingly, embodiments of the invention also include non-transitory, tangible machine-readable media containing instructions formatted according to the vector friendly instruction format or containing design data, such as Hardware Description Language (HDL), which defines structures, circuits, apparatuses, processors and/or system features described herein. Such embodiments may also be referred to as program products.

In some cases, an instruction converter may be used to convert an instruction from a source instruction set to a target instruction set. For example, the instruction converter may translate (e.g., using static binary translation, dynamic binary translation including dynamic compilation), morph, emulate, or otherwise convert an instruction to one or more other instructions to be processed by the core. The instruction converter may be implemented in software, hardware, firmware, or a combination thereof. The instruction converter may be on processor, off processor, or part on and part off processor.

Figure 14:
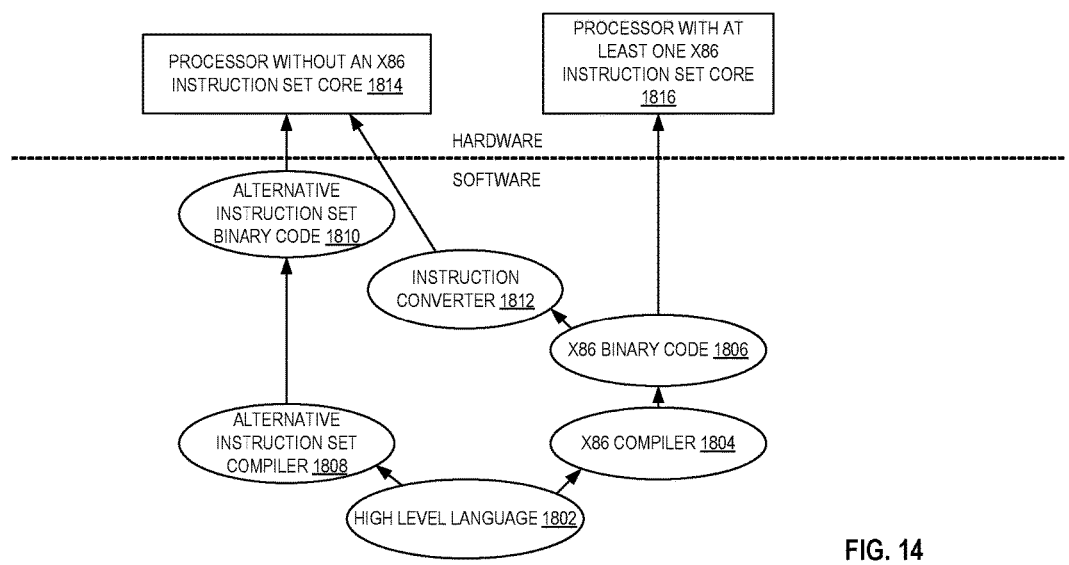
FIG. 14 is a block diagram contrasting the use of a software instruction converter to convert binary instructions in a source instruction set to binary instructions in a target instruction set according to embodiments of the invention.

FIG. 14 is a block diagram contrasting the use of a software instruction converter to convert binary instructions in a source instruction set to binary instructions in a target instruction set according to embodiments of the invention. In the illustrated embodiment, the instruction converter is a software instruction converter, although alternatively the instruction converter may be implemented in software, firmware, hardware, or various combinations thereof. FIG. 14 shows a program in a high level language 1802 may be compiled using an x86 compiler 1804 to generate x86 binary code 1806 that may be natively executed by a processor with at least one x86 instruction set core 1816 (it is assumed that some of the instructions that were compiled are in the vector friendly instruction format). The processor with at least one x86 instruction set core 1816 represents any processor that can perform substantially the same functions as an Intel processor with at least one x86 instruction set core by compatibly executing or otherwise processing (1) a substantial portion of the instruction set of the Intel x86 instruction set core or (2) object code versions of applications or other software targeted to run on an Intel processor with at least one x86 instruction set core, in order to achieve substantially the same result as an Intel processor with at least one x86 instruction set core. The x86 compiler 1804 represents a compiler that is operable to generate x86 binary code 1806 (e.g., object code) that can, with or without additional linkage processing, be executed on the processor with at least one x86 instruction set core 1816. Similarly, FIG. 14 shows the program in the high level language 1802 may be compiled using an alternative instruction set compiler 1808 to generate alternative instruction set binary code 1810 that may be natively executed by a processor without at least one x86 instruction set core 1814 (e.g., a processor with cores that execute the MIPS instruction set of MIPS Technologies of Sunnyvale, Calif. and/or that execute the ARM instruction set of ARM Holdings of Sunnyvale, Calif.). The instruction converter 1812 is used to convert the x86 binary code 1806 into code that may be natively executed by the processor without an x86 instruction set core 1814. This converted code is not likely to be the same as the alternative instruction set binary code 1810 because an instruction converter capable of this is difficult to make; however, the converted code will accomplish the general operation and be made up of instructions from the alternative instruction set. Thus, the instruction converter 1812 represents software, firmware, hardware, or a combination thereof that, through emulation, simulation or any other process, allows a processor or other electronic device that does not have an x86 instruction set processor or core to execute the x86 binary code 1806.

Certain operations of the instruction(s) in the vector friendly instruction format disclosed herein may be performed by hardware components and may be embodied in machine-executable instructions that are used to cause, or at least result in, a circuit or other hardware component programmed with the instructions performing the operations. The circuit may include a general-purpose or special-purpose processor, or logic circuit, to name just a few examples. The operations may also optionally be performed by a combination of hardware and software. Execution logic and/or a processor may include specific or particular circuitry or other logic responsive to a machine instruction or one or more control signals derived from the machine instruction to store an instruction specified result operand. For example, embodiments of the instruction(s) disclosed herein may be executed in one or more the systems of FIGS. 9-13 and embodiments of the instruction(s) in the vector friendly instruction format may be stored in program code to be executed in the systems. Additionally, the processing elements of these figures may utilize one of the detailed pipelines and/or architectures (e.g., the in-order and out-of-order architectures) detailed herein. For example, the decode unit of the in-order architecture may decode the instruction(s), pass the decoded instruction to a vector or scalar unit, etc.

The above description is intended to illustrate preferred embodiments of the present invention. From the discussion above it should also be apparent that especially in such an area of technology, where growth is fast and further advancements are not easily foreseen, the invention can may be modified in arrangement and detail by those skilled in the art without departing from the principles of the present invention within the scope of the accompanying claims and their equivalents. For example, one or more operations of a method may be combined or further broken apart.

Alternative Embodiments

While embodiments have been described which would natively execute the vector friendly instruction format, alternative embodiments of the invention may execute the vector friendly instruction format through an emulation layer running on a processor that executes a different instruction set (e.g., a processor that executes the MIPS instruction set of MIPS Technologies of Sunnyvale, Calif., a processor that executes the ARM instruction set of ARM Holdings of Sunnyvale, Calif.). Also, while the flow diagrams in the figures show a particular order of operations performed by certain embodiments of the invention, it should be understood that such order is exemplary (e.g., alternative embodiments may perform the operations in a different order, combine certain operations, overlap certain operations, etc.).

In the description above, for the purposes of explanation, numerous specific details have been set forth in order to provide a thorough understanding of the embodiments of the invention. It will be apparent however, to one skilled in the art, that one or more other embodiments may be practiced without some of these specific details. The particular embodiments described are not provided to limit the invention but to illustrate embodiments of the invention. The scope of the invention is not to be determined by the specific examples provided above but only by the claims below.

It is to be understood that the above description is intended to be illustrative and not restrictive. Many other embodiments will be apparent to those of skill in the art upon reading and understanding the above description. The scope of the invention should, therefore, be determined with reference to the appended claims, along with the full scope of equivalents to which such claims are entitled.

What is claimed is:

1. A method comprising:
receiving, by an instruction fetch circuit of a processor, a loop alignment instruction, the loop alignment instruction indicating a base address of an array as a first operand, a loop limit as a second operand, a destination, and an immediate to indicate an alignment width, wherein the alignment width is equal to a width of a data store used by the processor for processing packed data, and wherein a loop contains a plurality of iterations and in each iteration, a data element of the array is to be processed;
decoding, by a decode circuit of the processor, the received loop alignment instruction;
executing, by an execution circuit of the processor, the decoded loop alignment instruction; and
storing a result of the execution in the destination, the result of the execution indicating a number of data elements at a beginning of the array;
handling the number of data elements at the beginning of the array separately from handling a remaining portion of the array, such that a base address of the remaining portion of the array aligns with the alignment width by being an integer multiple of the alignment width;
wherein the separate handling comprises processing the number of data elements at the beginning of the array using a vector operation that does not operate on a full width of a vector separately from processing the remaining portion of the array utilizing only full width vector operations;
wherein the processing the remaining portion of the array using full width vector operations comprises, when processing multiple data elements in a same vector, performing a packed data operation in parallel on each of the multiple data elements; and
wherein the loop alignment instruction is a machine instruction.

2. The method of claim 1, wherein the loop alignment instruction is a loop alignment count instruction and the number of data elements at the beginning of the array that are handled separately from the remaining portion of the array, as indicated in the result, is an integer value.

3. The method of claim 1, wherein the loop alignment instruction is a loop alignment mask instruction and the result is a packed data operation mask having a number of mask elements set to a predetermined value, each of the number of mask elements set to the predetermined value corresponding to one of the data elements at the beginning of the array handled separately from the remaining portion of the array.

4. The method of claim 3, wherein each of the number of mask elements is a bit.

5. The method of claim 1, wherein the loop alignment instruction identifies a width of the data element of the array by a mnemonic.

6. The method of claim 1, wherein the immediate is to specify one of 128 bits, 256 bits, and 512 bits as the alignment width.

7. The method of claim 1, wherein the packed data operation comprises adding a scalar value.

8. An apparatus comprising:
a first register to store a base address of an array;
a second register to store a loop limit, the loop limit to specify a number of iterations in a loop, wherein a data element of the array is to be processed during each iteration of the loop;
a decode circuit coupled with the first register and the second register, the decode circuit to decode a loop alignment instruction received by an instruction fetch circuit and indicating the first register, the second register, a destination, and an immediate to specify an alignment width; and
an execution circuit coupled with the decode circuit, the execution circuit to:
execute the decoded loop alignment instruction and store a result of the execution in the destination, the result of the execution indicating a number of data elements at a beginning of the array; and
handle the number of data elements at the beginning of the array separately from handling a remaining portion of the array, wherein a base address of the remaining portion of the array aligns with the alignment width by being an integer multiple of the alignment width, wherein the alignment width is equal to a width of a data store used by the execution circuit for processing packed data;
wherein the separate handling comprises processing the number of data elements at the beginning of the array using a vector operation that does not operate on a full width of a vector separately from processing the remaining portion of the array utilizing only full width vector operations;
wherein the processing the remaining portion of the array using full width vector operations comprises, when processing multiple data elements in a same vector, doing so in parallel for the multiple data elements; and
wherein the loop alignment instruction is a machine instruction.

9. The apparatus of claim 8, wherein the loop alignment instruction is a loop alignment count instruction and the number of data elements at the beginning of the array that are handled separately, as indicated in the result, is an integer value.

10. The apparatus of claim 8, wherein the loop alignment instruction is a loop alignment mask instruction and the result is a packed data operation mask having a number of mask elements set to a predetermined value, each of the number of mask elements set to a predetermined value corresponding to one of the data elements at the beginning of the array handled separately from the remaining portion of the array.

11. The apparatus of claim 10, wherein each of the number of mask elements is a bit.

12. The apparatus of claim 8, wherein the loop alignment instruction identifies a width of the data element of the array.

13. The apparatus of claim 8, wherein the immediate is to specify one of 128 bits, 256 bits, and 512 bits as the alignment width.

14. A system comprising:
an interconnect;
a processor coupled to the interconnect, the processor including:
   a first register to store a base address of an array, a second register to store a loop limit, the loop limit to specify a number of iterations in a loop, wherein a data element of the array is to be processed during each iteration of the loop;
   a decode circuit coupled with the first register and the second register, the decode circuit to decode a loop alignment instruction indicating the first register, the second register, a destination, and an immediate to specify an alignment width; and
   an execution circuit coupled with the decode circuit, the execution circuit to: execute the decoded loop alignment instruction and store a result of the execution in the destination, the result of the execution indicating a number of data elements at a beginning of the array; and
   handle the number of data elements at the beginning of the array separately from handling a remaining portion of the array, wherein a base address of the remaining portion of the array aligns with the alignment width by being an integer multiple of the alignment width, wherein the alignment width is equal to a width of a data store used by the execution circuit for processing packed data; and
a dynamic random access memory (DRAM) coupled to the interconnect;
   wherein the separate handling comprises processing the number of data elements at the beginning of the array using a vector operation that does not operate on a full width of a vector separately from processing the remaining portion of the array utilizing only full width vector operations;
   wherein the processing the remaining portion of the array using full width vector operations comprises, when processing multiple data elements in a same vector, performing an arithmetic packed data operation in parallel on each of the multiple data elements; and
   wherein the loop alignment instruction is a machine instruction.

15. The system of claim 14, wherein the loop alignment instruction is a loop alignment count instruction and the number of data elements at the beginning of the array that are handled separately from the remaining portion of the array, as indicated in the result, is an integer value.

16. The system of claim 14, wherein the loop alignment instruction is a loop alignment mask instruction and the result is a packed data operation mask having a number of mask elements set to a predetermined value, each of the number of mask elements set to a predetermined value corresponding to one of the data elements at the beginning of the array handled separately from the remaining portion of the array.

17. The system of claim 14, wherein the immediate is to specify one of 128 bits, 256 bits, and 512 bits as the alignment width.

\* \* \* \* \*